United States Patent
Kephart

(10) Patent No.: US 8,757,413 B1
(45) Date of Patent: Jun. 24, 2014

(54) BICYCLE STORAGE SYSTEMS

(71) Applicant: Randel Ward Kephart, Maricopa, AZ (US)

(72) Inventor: Randel Ward Kephart, Maricopa, AZ (US)

(*) Notice: Subject to any disclaimer, the term of this patent is extended or adjusted under 35 U.S.C. 154(b) by 0 days.

(21) Appl. No.: 13/798,943

(22) Filed: Mar. 13, 2013

Related U.S. Application Data

(60) Provisional application No. 61/664,661, filed on Jun. 26, 2012, provisional application No. 61/612,578, filed on Mar. 19, 2012.

(51) Int. Cl.
*B62J 9/00* (2006.01)

(52) U.S. Cl.
USPC ............................. 220/23.83; 206/804

(58) Field of Classification Search
USPC .............. 206/804, 209, 361, 63.5; 220/23.83, 220/522, 521; 134/143
See application file for complete search history.

(56) References Cited

U.S. PATENT DOCUMENTS

| | | | |
|---|---|---|---|
| 1,584,261 A * | 5/1926 | Vuolo | 206/362.1 |
| 4,538,862 A | 9/1985 | Chandler | |
| 5,271,520 A | 12/1993 | McAfee | |
| 5,318,183 A | 6/1994 | Cohen et al. | |
| 5,402,810 A * | 4/1995 | Donley | 134/135 |
| 5,634,569 A * | 6/1997 | DeCoster | 220/735 |
| 6,213,777 B1 * | 4/2001 | Seitzinger | 433/229 |
| 6,837,407 B1 | 1/2005 | Towers et al. | |
| 6,989,168 B2 | 1/2006 | Fahey | |
| 7,614,512 B2 | 11/2009 | Nader | |
| 7,798,346 B2 | 9/2010 | Nelson et al. | |
| 2006/0151414 A1 | 7/2006 | Mullen | |
| 2007/0278174 A1 | 12/2007 | Kunz et al. | |
| 2011/0036803 A1 | 2/2011 | Mejia et al. | |
| 2011/0163102 A1 | 7/2011 | Haynie | |
| 2011/0198355 A1 | 8/2011 | Mullen | |

* cited by examiner

*Primary Examiner* — Steven A. Reynolds
*Assistant Examiner* — King M Chu
(74) *Attorney, Agent, or Firm* — Stoneman Law Patent Group; Martin L. Stoneman; David A. Spellman

(57) ABSTRACT

A storage system relating to a removable carrier to hold items carried on a bicycle, preferably utilizing a standard-sized water-bottle cage.

8 Claims, 5 Drawing Sheets

BICYCLE STORAGE SYSTEMS

CROSS-REFERENCE TO RELATED APPLICATION

The present application is related to and claims priority from prior provisional application Ser. No. 61/612,578, filed Mar. 19, 2012, entitled "BICYCLE STORAGE SYSTEMS"; and, this application is related to and claims priority from prior provisional application Ser. No. 61/664,661, filed Jun. 26, 2012, entitled "BICYCLE STORAGE SYSTEMS", the contents of all of which are incorporated herein by this reference and are not admitted to be prior art with respect to the present invention by the mention in this cross-reference section.

BACKGROUND

This invention relates to providing a system for improved storage and carrying of items when riding a bicycle. More particularly, this invention relates to providing a system for storing items, preferably utilizing a standard bicycle-bottle cage.

Many cyclists carry water or other fluids in water bottles while riding and often such water bottles are held in brackets, also referred to as bottle cages, which mount onto bicycle frames to support such water bottles. In addition to water, cyclists often need to carry various other items when riding, such as, for example, repair materials, cell phone, wallet, keys, snacks, etc. Cyclists have limited options available for storage of items they wish to carry when riding.

In the past, bicycle riders have placed items in large baskets installed on the bicycle. Such baskets are held secure and remain attached to the bicycle. Also in the past, cyclists have places items in their clothing or in wearable bags, such as backpacks and satchels. Cyclists who carry items in their clothing or in wearable bags find that such carrying is cumbersome and affects their riding performance.

A conventional means for storing the above items is within a seat-mounted bag. Such bags mount underneath the rear portion of the seat of the bicycle; however, many cyclists now prefer to use water-bottle cages that mount in the same location. This can make seat bags difficult to install and access.

A need exists for an alternate bicycle storage option that provides cyclists with convenient, non-cumbersome storage solutions that also offer protection and organization of their items while riding.

OBJECTS AND FEATURES OF THE INVENTION

A primary object and feature of the present invention is to provide a system overcoming the above-mentioned problem(s).

It is a further object and feature of the present invention to provide such a system providing a storage system for items carried on a bicycle, preferably utilizing a standard bicycle-bottle cage.

It is another object and feature of the present invention to provide such a system providing structured organization of items stored within an apparatus of the system. Another object and feature of the present invention is to permit a cyclist the ability to easily transport their stored items from bicycle to bicycle and permits a cyclist the ability to remove the apparatus from the bicycle and carry their stored items with their person.

Another object and feature of the present invention is to provide a removable organization component to assist in removing items from the storage container while retaining those items in an organized position. Still another object and feature of the present invention is to provide a quick-access port for access items stored with the storage container. In addition, an object and feature of the present invention is to provide an organization system that assists a user in maximizing use of available volume within the storage container for storage of desired items. Also, a primary object and feature of the present invention is to provide an organization system that assists retaining organized items in a fixed position with respect to the organizational system.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a bicycle storage system, relating to storage of at least one personal item adjacent a bicycle, comprising: at least one container comprising at least one internal compartment structured and arranged to at least partially contain the at least one personal item; within such at least one container, at least one access opening configured to assist external access to such at least one internal compartment; at least one access cover structured and arranged to cover such at least one access opening; and at least one item positioner structured and arranged to fixedly position the at least one personal item within such at least one internal compartment; wherein such at least one item positioner is structured and arranged to permit passage of such at least one item positioner through such at least one access opening; wherein such at least one access cover comprises at least one hingeless coupler structured and arranged to enable hingeless coupling of such at least one access cover with such at least one container; wherein such at least one access cover is repositionable between at least one position covering such at least one access opening and at least one position uncovering such at least one access opening; and wherein such at least one container is structured and arranged to be supported within a standard bicycle water bottle cage.

Moreover, it provides such a bicycle storage system wherein: such at least one container comprises a substantially elongated body having at least one upper end, at least one base end, a longitudinal axis passing through such at least one upper end and such at least one base end, and a minimum transverse cross-sectional area oriented along and perpendicularly of such longitudinal axis; such at least one base end comprises a substantially enclosed end; such at least one upper end comprises such at least one access opening; and such at least one access opening comprises an open area at least equal to such minimum transverse cross-sectional area. Additionally, it provides such a bicycle storage system wherein such substantially elongated body of such at least one container comprises a cylindrical shape having a maximum outer diameter of about 2⅞ inches. Also, it provides such a bicycle storage system wherein: such substantially elongated body of such at least one container comprises at least one reduced transverse cross-sectional area located about five inches above such at least one base end; such at least one reduced transverse cross-sectional area is oriented along and perpendicularly of such longitudinal axis; and such reduced transverse cross-sectional area is less than about 6½ square inches.

In addition, it provides such a bicycle storage system wherein: such at least one access cover comprises at least one removable lid; and such at least one hingeless coupler comprises at least one threaded coupler structured and arranged to assist threaded coupling of such at least one removable lid to such at least one container. And, it provides such a bicycle storage system wherein such at least one item positioner comprises at least one tool-engaging retainer structured and arranged to releasably retain at least one bicycle tool adjacent such at least one item positioner. Further, it provides such a bicycle storage system wherein such at least one item positioner comprises at least one bicycle-tube retainer structured and arranged to releasably retain at least one bicycle tube adjacent such at least one item positioner. Even further, it provides such a bicycle storage system wherein such at least one item positioner is firmly coupled with such at least one access cover.

Moreover, it provides such a bicycle storage system wherein such at least one access cover further comprises: at least one personal-item external receiver structured and arranged to receive and removably retain the at least one personal item at least partially external of such at least one internal compartment; wherein such at least one personal-item receiver is configured to permit external user access to the at least one personal item without repositioning such at least one access cover to such at least one position uncovering such at least one access opening.

In accordance with another preferred embodiment hereof, this invention provides a method, relating to providing storage of at least one personal item adjacent a bicycle, comprising the steps of: providing at least one container comprising at least one internal compartment structured and arranged to at least partially contain the at least one personal item; providing within such at least one container, at least one access opening configured to assist external access to such at least one internal compartment; providing at least one access cover structured and arranged to cover such at least one access opening; providing at least one item positioner structured and arranged to fixedly position the at least one personal item within such at least one internal compartment; configuring such at least one item positioner to permit passage of such at least one item positioner through such at least one access opening; configuring such at least one access cover to comprise at least one hingeless coupler structured and arranged to enable hingeless coupling of such at least one access cover with such at least one container; configuring such at least one access cover to be repositionable between at least one position covering such at least one access opening and at least one position uncovering such at least one access opening; and configuring such at least one container to be supported within a standard bicycle water bottle cage.

Additionally, it provides such a method further comprising the step of: configuring such at least one container to comprise a substantially elongated body having at least one upper end, at least one base end, a longitudinal axis passing through such at least one upper end and such at least one base end, and a minimum transverse cross-sectional area oriented along and perpendicularly of such longitudinal axis; configuring such at least one base end to comprise a substantially enclosed end; configuring such at least one upper end to comprise such at least one access opening; and configuring such at least one access opening to comprise an open area at least equal to such minimum transverse cross-sectional area.

Also, it provides such a method further comprising the step of configuring such substantially elongated body of such at least one container to comprise a cylindrical shape having a maximum outer diameter of about 2⅞ inches. In addition, it provides such a method further comprising the steps of: configuring such substantially elongated body of such at least one container to comprise at least one reduced transverse cross-sectional area located about five inches above such at least one base end; wherein such at least one reduced transverse cross-sectional area is oriented along and perpendicularly of such longitudinal axis; and configuring such reduced transverse cross-sectional area to be less than about 6½ square inches. And, it provides such a method further comprising the steps of: configuring such at least one access cover to comprise at least one removable lid; and configuring such at least one hingeless coupler to comprise at least one threaded coupler structured and arranged to assist threaded coupling of such at least one removable lid to such at least one container.

Further, it provides such a method further comprising the step of configuring such at least one item positioner to comprise at least one tool-engaging retainer structured and arranged to releasably retain at least one bicycle tool adjacent such at least one item positioner. Even further, it provides such a method further comprising the step of configuring such at least one item positioner to comprise at least one bicycle-tube retainer structured and arranged to releasably retain at least one bicycle tube adjacent such at least one item positioner.

Even further, it provides such a method further comprising the step of configuring such at least one item positioner to be firmly coupled with such at least one access cover. Even further, it provides such a method further comprising the steps of: configuring such at least one personal-item external receiver to receive and removably retain the at least one personal item at least partially external of such at least one internal compartment; configuring such at least one personal-item receiver to permit external user access to the at least one personal item without repositioning such at least one access cover to such at least one position uncovering such at least one access opening.

In accordance with another preferred embodiment hereof, this invention provides a bicycle storage system, relating to storage of at least one personal item adjacent a bicycle, comprising: containing means for at least partially containing the at least one personal item; accessing means for assisting internal access to internal portions of such containing means; access covering means for covering such accessing means; and item positioning means for fixedly positioning the at least one personal item within such internal portions of such containing means; wherein such access covering means comprises hingeless coupling means for enabling hingeless coupling of such access covering means with such container means; wherein such container means is configured to be supported within a standard bicycle water bottle cage.

In accordance with another preferred embodiment hereof, this invention provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
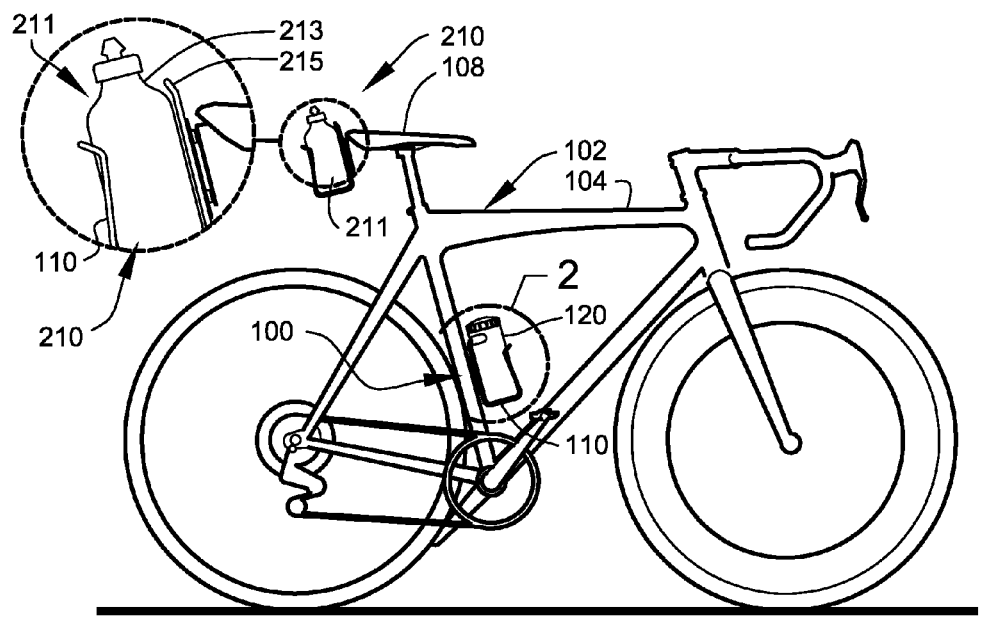
FIG. 1 shows a diagrammatic side view, illustrating a bicycle storage system, according to a preferred embodiment of the present invention.
Figures 2, 3:
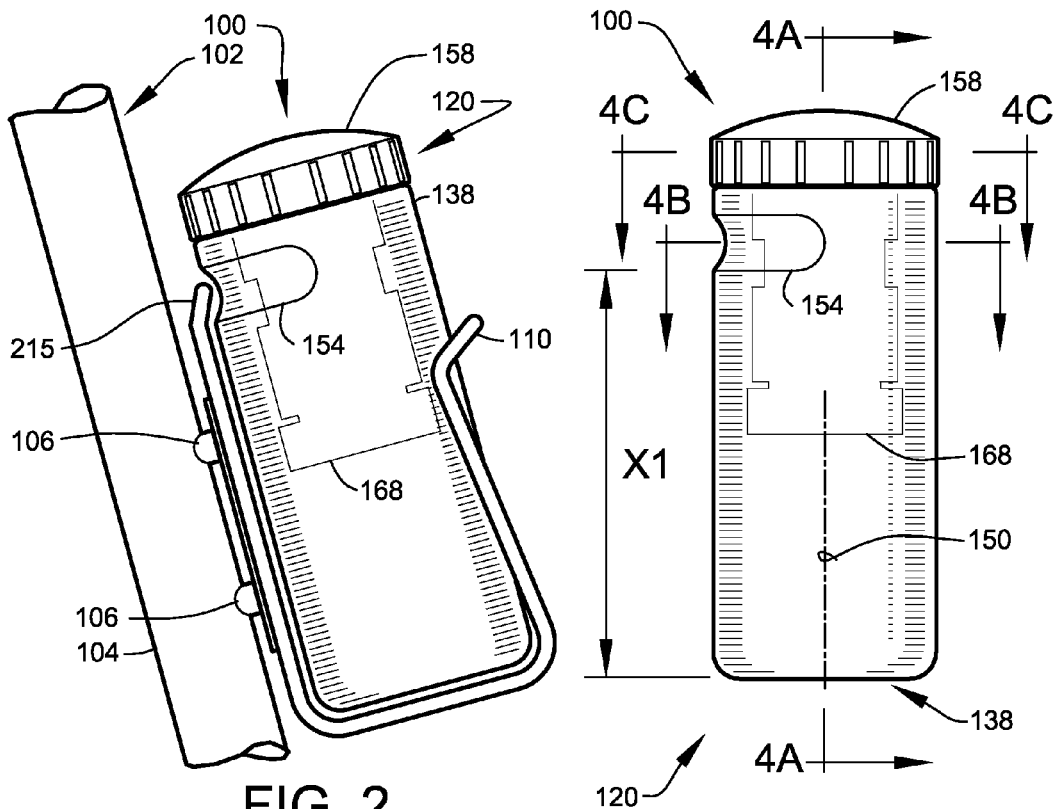
FIG. 2 shows a partial side view, enlarged for magnification purposes, illustrating a storage container, according to the preferred embodiment of FIG. 1, supported within a standard bottle cage of a bicycle.
FIG. 3 shows a side view, illustrating the storage container, according to the preferred embodiment of FIG. 1.

FIG. 1 shows a diagrammatic side view, illustrating bicycle storage system 100, according to a preferred embodiment of the present invention. FIG. 2 shows a partial side view, enlarged for magnification purposes, illustrating storage container 120, according to the preferred embodiment of FIG. 1. Bicycle storage system 100 preferably assists a bicycle operator with storage of personal items (see FIG. 4A).

The primary preferred component of cycle storage system 100 is a specialized storage container 120 configured to at least partially contain at least one personal item 153 (at least embodying herein containing means for at least partially containing the at least one personal item). Storage container 120 is preferably configured to be readily mountable to bicycle 102 using existing structures and componentry of the bicycle. Most preferably, storage container 120 is configured to be removably engaged within a standard bottle cage 110, as shown (at least embodying herein wherein such container means is configured to be supported within a standard bicycle water bottle cage). As an illustrative example, bottle cage 110 is attached to the bicycle using a set of threaded "braze-on" mounting tabs 106, which customarily comprise a pair of small fittings permanently attached to a portion of bicycle frame 104. Alternately, many cyclists now prefer to use bottle cages 110 mounted behind seat 108, which are often referred to as rear mounted carriers 210. Regardless of mounting position, such bottle cages 110 are configured to hold at least one standard bicycle water bottle 211, as shown.

Many different manufacturers produce bottle cages 110 in various configurations; however, most of the configurations are of a generally standardized design to allow a standard size bicycle water bottle 211 to be placed therein and retained. The most commonly-used bicycle water bottles 211 have an outer diameter of about 2⅞ inches (73 millimeters) and comprise an indentation, or region of reduced body diameter 213, located about five inches (127 millimeters) above the bottom of the bottle. Most standard bottle cages 110 comprise an inward projection 215 designed to hold the bottle within the cage by engaging such upper indentation or region of reduced body diameter 213, as shown. One example standard bottle cage 110 functional with the present system includes alloy water bicycle bottle cages produced by AvenirUSA of Kent, Wash.

Figure 4A:
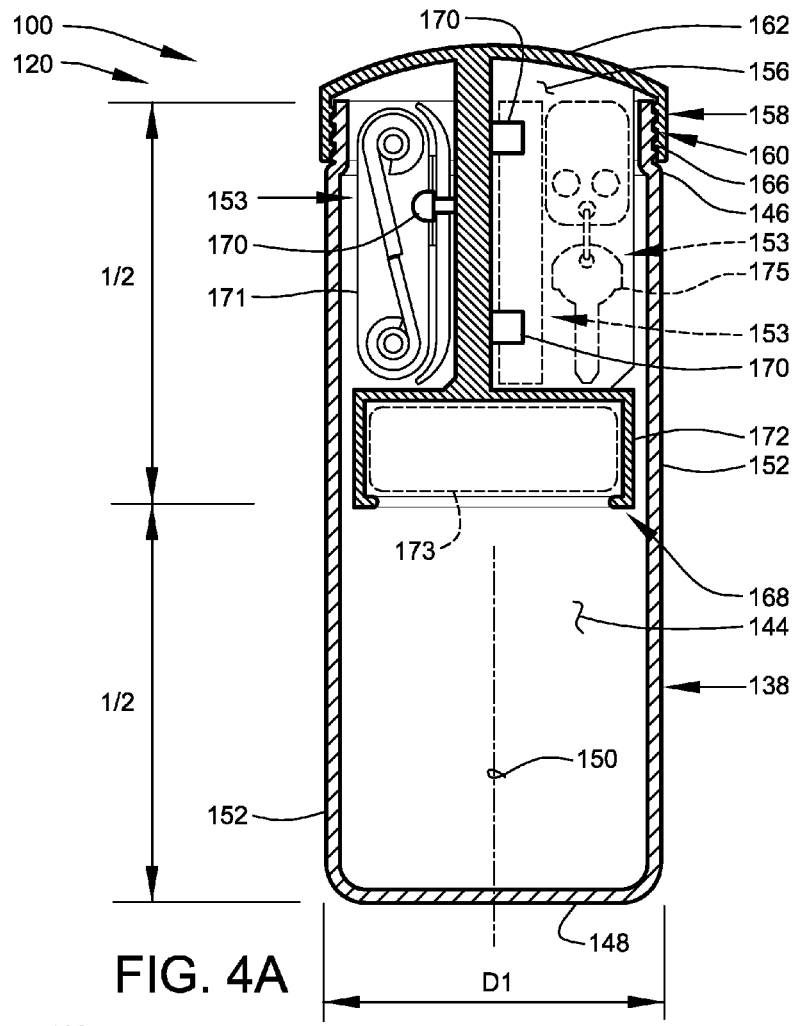
FIG. 4A shows a sectional view, through a section 4A-4A of FIG. 3, illustrating an interior arrangement of the storage container, according to the preferred embodiment of FIG. 1.

Applicant's preferred embodiments of bicycle storage system 100 preferably utilize the variety of standardized bottle cages 110 already being manufactured and installed on most bicycles. FIG. 3 shows a side view, illustrating preferred storage container 120, according to the preferred embodiment of FIG. 1. FIG. 4A shows a sectional view, through a section 4A-4A of FIG. 3, illustrating internal storage compartment 144 of storage container 120, according to the preferred embodiment of FIG. 1. Applicant designed storage container 120 after experimenting with various storage container configurations. Storage container 120 is preferably configured to fit within and be supported by such standard sized water bottle cage (at least embodying herein wherein such at least one container is structured and arranged to be supported within a standard bicycle water bottle cage).

As best illustrated in the cross-sectional view of FIG. 4A, storage container 120 preferably comprises a substantially hollow elongated body 138 having a substantially open upper end 146, at least one substantially enclosed base end 148, and a preferred geometry generally organized around a longitudinal axis 150 passing through upper end 146 and base end 148, as shown. Elongated body 138 preferably comprises outer wall 152 defining internal storage compartment 144, as shown. As previously noted, internal storage compartment 144 is preferably configured to at least partially contain personal items 153, as shown. In the present preferred embodiment of the present system, internal storage compartment 144 is preferably configured to fully contain personal items 153, as shown.

In one preferred embodiment of the present system, elongated body 138 of storage container 120 comprises a generally cylindrical shape having a maximum outer diameter D1 of about 2⅞ inches. As shown in the side-view depictions of FIG. 2 and FIG. 3, outer wall 152 of elongated body 138 preferably comprises at least one recess 154 that is preferably configured to receive the inward projection 215 of bottle cage 110. Recess 154 is preferably provided to assist retention of storage container 120 within bottle cage 110.

Figure 4B:
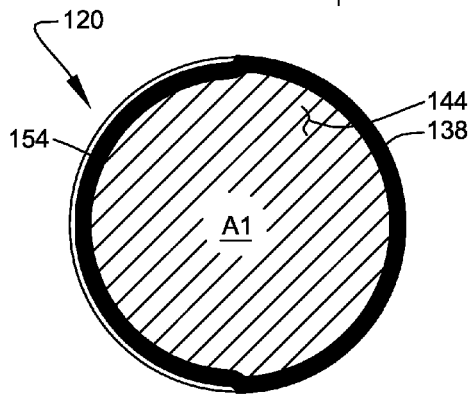
FIG. 4B shows a sectional view, through a section 4B-4B of FIG. 3, illustrating an interior arrangement of the storage container, according to the preferred embodiment of FIG. 1.

As best illustrated in FIG. 4B, recess 154 corresponds to a minimum transverse cross-sectional area within the elongated body 138 (for the purpose of further describing the preferred embodiments of the present system, such minimum transverse cross-sectional area is indentified herein as "region of reduced transverse cross-sectional area $A_1$"), as shown in FIG. 4B by the shaded region. Such region of reduced transverse cross-sectional area $A_1$ is preferably measured at a geometric plane oriented both along and perpendicular to longitudinal axis 150 and is preferably located a distance X1 of about five inches above base end 148. Preferably, area $A_1$ is as large as possible and still permit bottle to be retained by inward projection 215 of bottle cage 110. In the present preferred embodiment of the present system, such region of reduced transverse cross-sectional area $A_1$ is preferably equal to or less than about 6½ square inches.

Figure 4C:
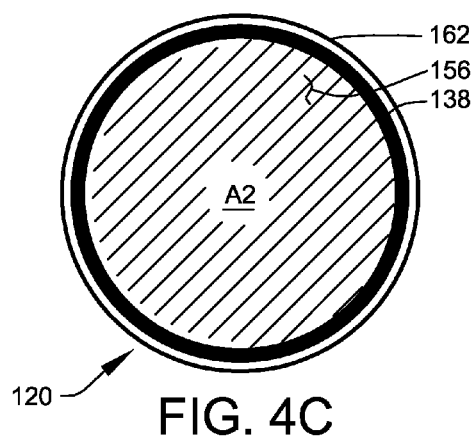
FIG. 4C shows a sectional view, through a section 4C-4C of FIG. 3, illustrating an interior arrangement of the storage container, according to the preferred embodiment of FIG. 1.

Referring again to the sectional view of FIG. 4A, external access to internal storage compartment 144 is preferably enabled by the presence of a large access opening 156 preferably located within open upper end 146, as shown (at least embodying herein, within such at least one container, at least one access opening configured to assist external access to such at least one internal compartment and at least embodying herein accessing means for assisting internal access to internal portions of such containing means). Referring to the sectional view of FIG. 4C, external access of internal storage compartment 144 is preferably maximized by configuring access opening 156 to comprise an open area $A_2$ at least equal to such minimum transverse cross-sectional area $A_1$ (at least embodying herein such at least one access opening comprises an open area at least equal to such minimum transverse cross-sectional area of such at least one container).

Storage container 120 is preferably supplied with at least one access cover 158 provided to protectively cover access opening 156 during storage of the items (at least embodying herein access covering means for covering such accessing means). This preferred feature protects the stored items from exposure to water, dust, and similar potentially damaging debris. Access cover 158 is preferably configured to be repositionable between at least one position covering access opening 156 and at least one position uncovering access opening 156 (see FIG. 5).

Access cover 158 preferably comprises at least one hingeless coupler 160 configured to enable hingeless coupling of access cover 158 with open upper end 146 of elongated body 138 (at least embodying herein wherein such access covering means comprises hingeless coupling means for enabling hingeless coupling of such access covering means with such container means). This preferred feature preferably functions to positively secure the protective cover over access opening 156. In the depicted preferred embodiment of the system, access cover 158 preferably comprises a detachable/removable lid 162 and hingeless coupler 160 comprises a threaded-coupling assembly configured to assist threaded coupling of the removable lid 162 to open upper end 146 of storage container 120, as shown. In more specific terms, lid 162 comprises a set of internal threads 164, which are preferably configured to threadably engage a complementary set of external threads 166 formed circumferentially about access opening 156 of open upper end 146. Upon reading this specification, those with ordinary skill in the art will now appreciate that, under appropriate circumstances, considering such issues as design preference, user preferences, marketing preferences, cost, structural requirements, available materials, etc., other coupling arrangements such as, for example, friction-assisted couplers, "snap-lock" structures, quick-release couplers, press-fit couplers, etc., may suffice.

Figure 5:
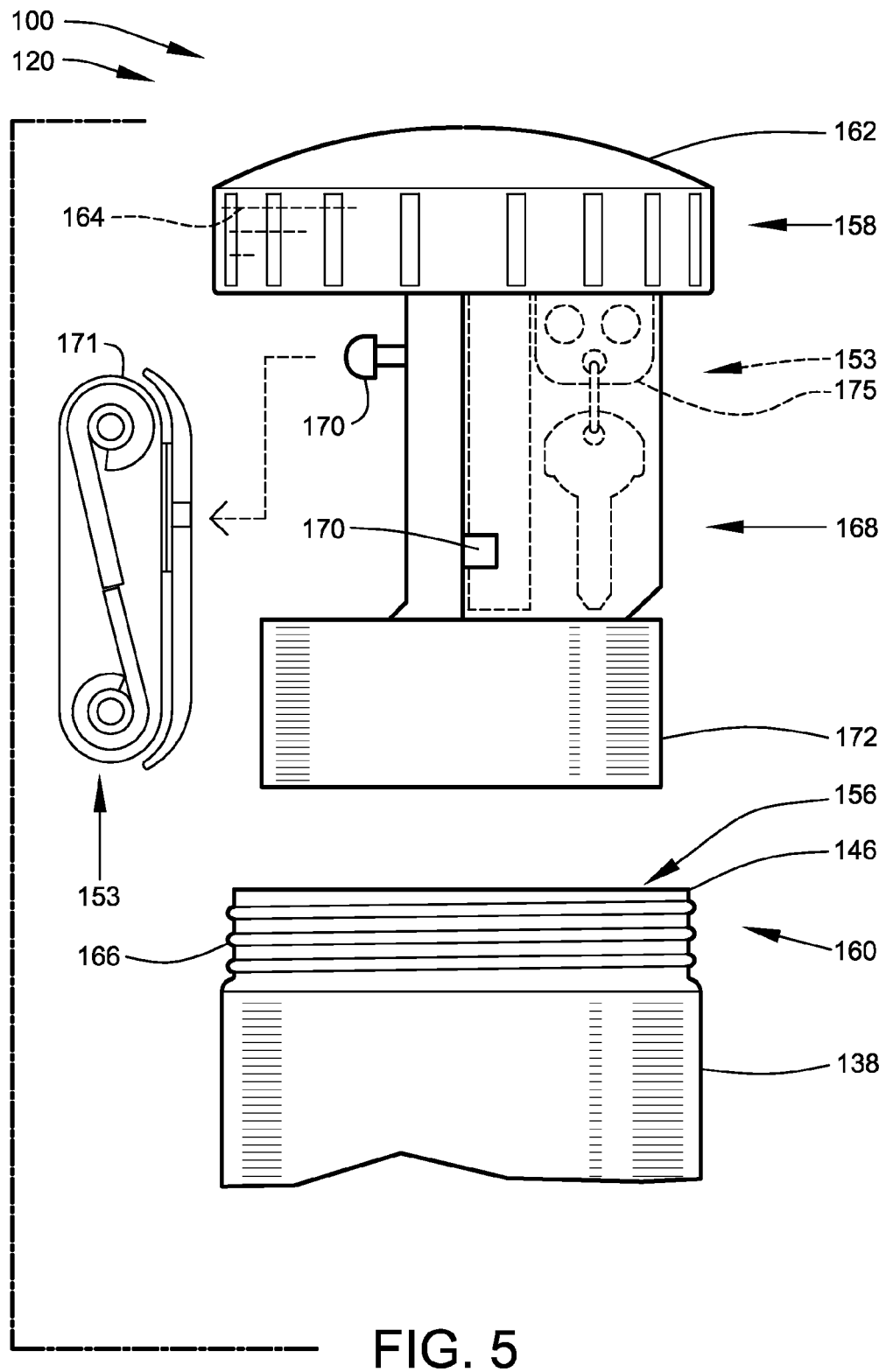
FIG. 5 shows a partial exploded view, illustrating a positioner component of the storage container, according to the preferred embodiment of FIG. 1.

Storage container 120 preferably comprises at least one item positioner 168 structured and arranged to fixedly position items 153 within internal storage compartment 144, as shown (at least embodying herein item positioning means for fixedly positioning the at least one personal item within such internal portions of such containing means). FIG. 5 shows a partial exploded view, illustrating the internally-located item positioner 168. Item positioner 168 is preferably designed to organize and support items such as repair tools 171, replacement bicycle tubes 173, keys 175, maps, money, identification/payment cards, a cell phone, etc. Item positioner 168 is preferably structured and arranged to permit passage of item positioner 168 through access opening 156. In preferred embodiments of the present system, item positioner 168 preferably occupies roughly the upper half of internal storage compartment 144, as shown. This preferred physical arrangement provides an area of unstructured storage in the lower portion of internal storage compartment 144, as shown.

In one preferred embodiment of the present system, item positioner 168 is firmly coupled with lid 162. In one preferred arrangement, item positioner 168 and lid 162 are integrally formed as a single unit, as shown.

Item positioner 168 preferably comprises one or more item retainers 170 to assist in releasably retaining items 153 adjacent to or within item positioner 168. It should be noted that some item retainers 170 comprise generic item compatibility, that is, are preferably capable of retaining item of diverse size and shape. Such generic item retainers 170 may preferably comprise elastic holding bands, generously-sized compartments, item-receiving slots, etc. Alternately preferably, item positioner 168 may comprise one or more "item-specific" retaining features. For example, one preferred item positioner 168 preferably comprises at least one tool-engaging retainer 170 structured and arranged to releasably retain at least one bicycle repair tool 171 adjacent item positioner 168. Such a retainer preferably utilizes one or more pre-existing physical features of the tool as a means for retaining the item to item positioner 168 during storage. FIG. 4A through FIG. 6 show a post-like tool-engaging retainer 170 designed to engage a slotted feature of a model IB-3 multi-tool produced by Park Tool of St. Paul, Minn. Upon reading this specification, those with ordinary skill in the art will now appreciate that, under appropriate circumstances, considering such issues as design preference, user preferences, marketing preferences, cost, structural requirements, available materials, technological advances, etc., other retainer arrangements such as, for example, retainers for other tools, spring-loaded clips, hook-and look retainers, molded receivers, etc., may suffice.

FIG. 4A through FIG. 6 also show bicycle-tube retainer 172 structured and arranged to releasably retain at least one bicycle tube 173 within item positioner 168. Bicycle-tube retainer 172 preferably comprises a hollow cylindrical compartment preferably sized to receive a rolled or folded bicycle tube 173, as shown. An elastic-band retainer, releasable clip, attachable cover, etc. may preferably be used to further retain folded bicycle tube 173 within bicycle-tube retainer 172.

Figure 6:
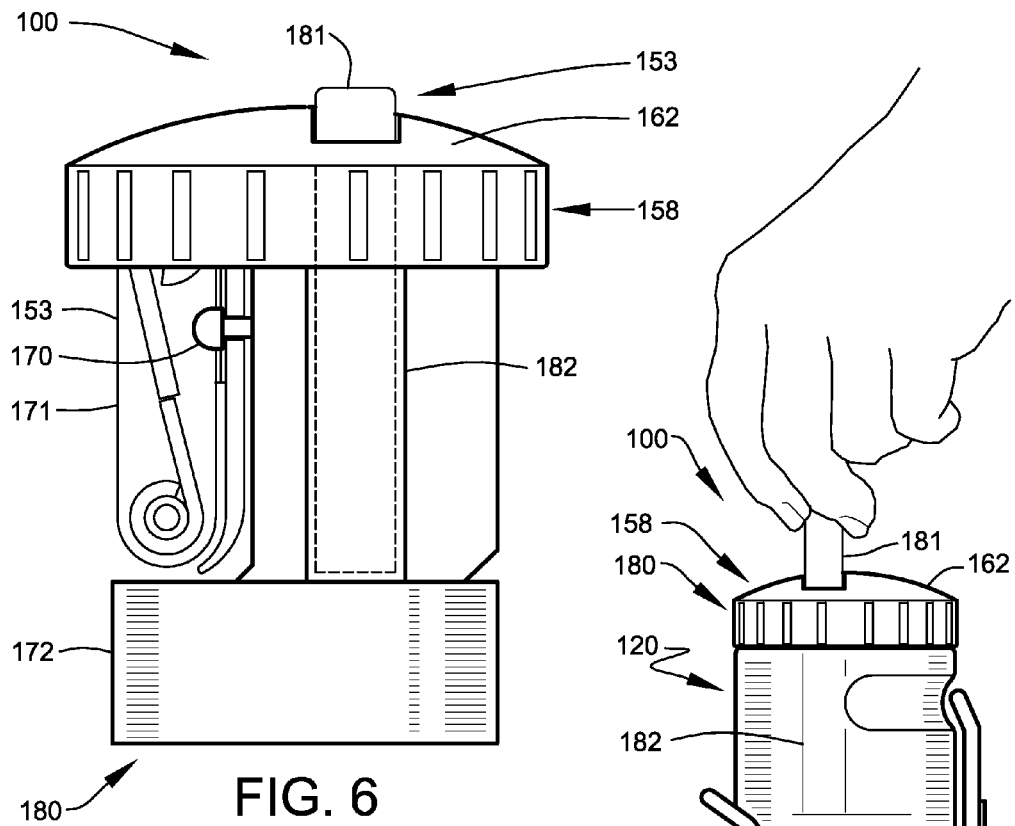
FIG. 6 shows a side view, illustrating an alternate positioner component of the storage container, according to the preferred embodiment of FIG. 1.

FIG. 6 shows a side view, illustrating an alternate item positioner 180 of the storage container 120, according to the preferred embodiment of FIG. 1. Alternate item positioner 180 preferably includes at least one personal-item external receiver 182 structured and arranged to receive and removably retain at least one personal item 153 at least partially external of internal storage compartment 144, as shown. This preferred feature is intended to provide convenient storage of items requiring quick access. Such external receiver 182 is preferably configured to permit external user access to the item without repositioning access cover 158 to uncover access opening 156. Thus, external receiver 182 is especially useful in the storage of mobile communication devices 181, such as, for example, cellular phones.

Figure 7:
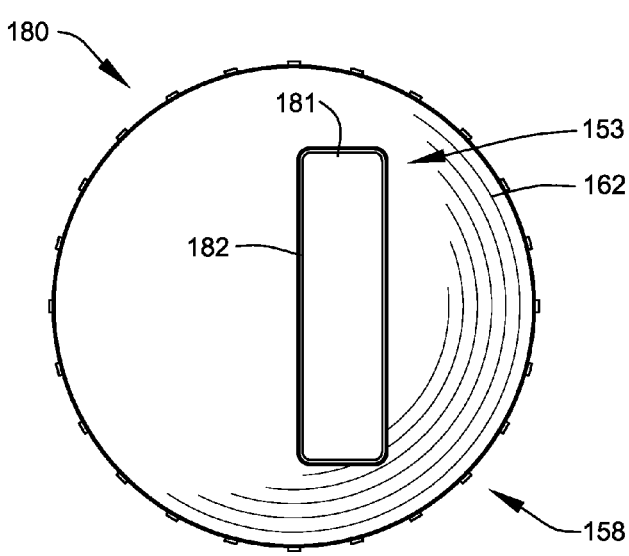
FIG. 7 shows a top view, illustrating the positioner component, according to the preferred embodiment of FIG. 6.
Figure 8:
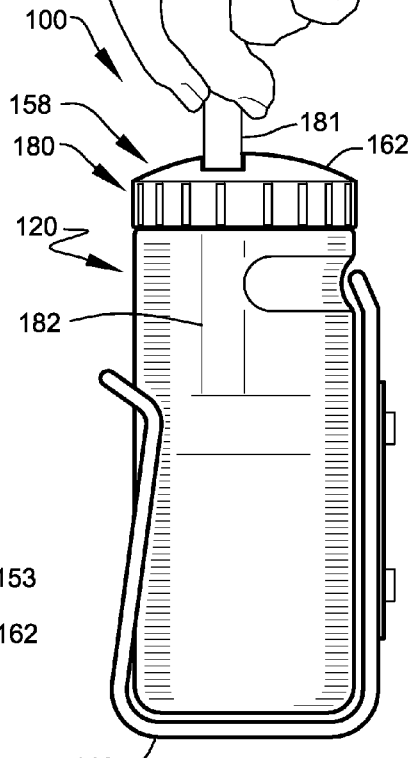
FIG. 8 shows a perspective view, illustrating the storage container, according to the preferred embodiment of FIG. 6.

FIG. 7 shows a top view, illustrating external receiver 182 of alternate item positioner 180. FIG. 8 shows a side view, illustrating a user accessing a communication device 181 placed within external receiver 182 of storage container 120, according to the preferred embodiment of FIG. 6.

In one preferred embodiment of the present system, external receiver 182 of alternate item positioner 180 is integrated within lid 162. In one preferred arrangement, external receiver 182 and lid 162 are integrally formed as a single unit, as shown. Upon reading this specification, those with ordinary skill in the art will now appreciate that, under appropriate circumstances, considering such issues as design preference, user preferences, marketing preferences, cost, structural requirements, available materials, technological advances, etc., other external storage features such as, for example, providing protective covers or caps, etc., may suffice.

Applicant's storage container 120 is preferably available in two embodiment sizes. The first embodiment is a taller unit and would be used in longer bicycle rides where the carrying of additional items is required. The second embodiment is the shorter of the two containers and is used for shorter rides where less gear would be required. The shorter unit is also designed to be carried in a bicycle frame 104 that can only house the shorter container due to the restrictions of the bicycle geometry; that is, not all bicycles are able to carry the larger container.

Storage container 120 is preferably constructed from a plastic polymer, more preferably a clear plastic polymer. The apparatus is preferably manufactured by molding, preferably by blow molding. Upon reading this specification, those with ordinary skill in the art will now appreciate that, under appropriate circumstances, considering such issues as design preference, user preferences, marketing preferences, cost, structural requirements, available materials, technological advances, etc., other material arrangements such as, for example, lightweight metals, composites (carbon fiber), etc., may suffice.

Figure 9:
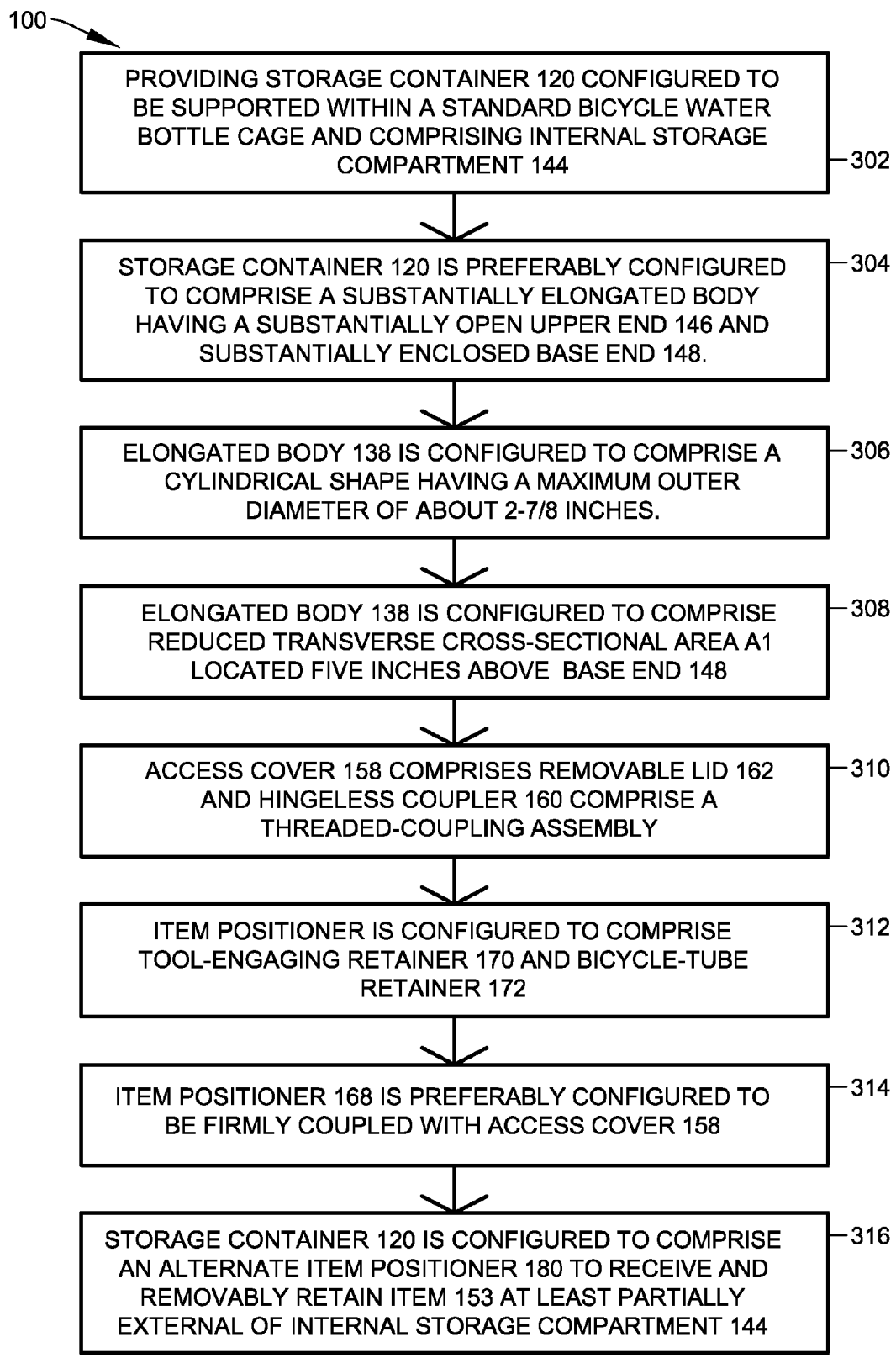
FIG. 9 shows a flow diagram illustrating the steps of a preferred method relating to providing storage of personal items adjacent a bicycle, according to preferred methods and embodiments of the present invention.

FIG. 9 shows a flow diagram illustrating the steps of preferred method 300, according to preferred methods and embodiments of the present invention. Method 300 preferably relates to providing storage of personal items 153 adjacent bicycle 102. In that regard, method 300 preferably comprises the initial step 302 of providing a storage container 120 configured to be supported within a standard bicycle water bottle cage and comprising at least one internal storage compartment 144 to at least partially contain personal items 153. Within step 302, access opening 156 is preferably provided within storage container 120 to permit external access to internal storage compartment 144. Step 302 also preferably includes the providing of an access cover 158 to cover access opening 156. Preferably, step 302 further includes the providing of internal item positioner 168 designed to position one or more items 153 within internal storage compartment 144. As previously noted, item positioner 168 is preferably sized to permit passage through access opening 156. Within step 302, access cover 158 is configured to comprise at least one hingeless coupler structured and arranged to enable hingeless coupling of access cover 158 with storage container 120. In this preferred arrangement, access cover 158 is preferably configured to be repositionable between the position covering access opening 156 and the position uncovering access opening 156.

In additional preferred step 304, storage container 120 is preferably configured to comprise a substantially elongated body having a substantially open upper end 146 and substantially enclosed base end 148. In such a preferred arrangement, storage container 120 preferably comprises longitudinal axis 150 passing through the upper end and base ends, and preferably comprises a minimum transverse cross-sectional area oriented along and perpendicularly of longitudinal axis 150. Within preferred step 304, access opening 156 is preferably configured to comprise an open area $A_2$ at least equal to such minimum transverse cross-sectional area $A_1$.

In additional preferred step 306, the elongated body 138 of storage container 120 is preferably configured to comprise a cylindrical shape having a maximum outer diameter of about 2⅞ inches. In additional preferred step 308, the elongated body 138 of storage container 120 is preferably configured to comprise at least one reduced transverse cross-sectional area $A_1$ located about five inches above the substantially enclosed base end 148 (wherein such reduced transverse cross-sectional area $A_1$ is oriented along and perpendicularly of longitudinal axis 150 and comprises a preferred area less than about 6½ square inches).

In additional preferred step 310, access cover 158 is preferably configured to comprise removable lid 162 and hingeless coupler 160 is preferably configured to comprise a threaded-coupling assembly structured and arranged to assist threaded coupling of lid 162 to storage container 120.

In additional preferred step 312, item positioner is preferably configured to comprise at least one tool-engaging retainer 170 and at least one bicycle-tube retainer 172. In additional preferred step 314, item positioner 168 is preferably configured to be firmly coupled with access cover 158. In alternate preferred step 316, storage container 120 is preferably configured to comprise an alternate item positioner 180 to receive and removably retain at least one personal item 153 at least partially external of internal storage compartment 144. Alternate item positioner 180 preferably permits external user access to item 153 without repositioning access cover 158 relative to access opening 156.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A bicycle storage system, relating to storage of at least one personal item adjacent a bicycle, comprising:
   a) at least one container comprising at least one internal compartment structured and arranged to at least partially contain the at least one personal item;
   b) within said at least one container, at least one access opening configured to assist external access to said at least one internal compartment;
   c) at least one access cover structured and arranged to cover said at least one access opening; and
   d) at least one item positioner structured and arranged to fixedly position the at least one personal item within said at least one internal compartment;
   e) wherein said at least one item positioner is structured and arranged to permit passage of said at least one item positioner through said at least one access opening;
   f) wherein said at least one access cover comprises at least one hingeless coupler structured and arranged to enable hingeless coupling of said at least one access cover with said at least one container;
   g) wherein said at least one access cover is repositionable between at least one position covering said at least one access opening and at least one position uncovering said at least one access opening; and
   h) wherein said at least one container is structured and arranged to be supported within a standard bicycle water bottle cage;
   i) wherein said at least one access cover further comprises at least one personal-item external receiver structured and arranged to receive and removably retain the at least one personal item at least partially external of said at least one internal compartment;
   j) wherein said at least one personal-item receiver is configured to permit external user access to the at least one personal item without repositioning said at least one access cover to such at least one position uncovering said at least one access opening.

2. The bicycle storage system, according to claim 1, wherein:
   a) said at least one container comprises a substantially elongated body having at least one upper end, at least one base end, a longitudinal axis passing through said at least one upper end and said at least one base end, and a minimum transverse cross-sectional area oriented along and perpendicularly of said longitudinal axis;

b) said at least one base end comprises a substantially enclosed end;

c) said at least one upper end comprises said at least one access opening; and d) said at least one access opening comprises an open area at least equal to said minimum transverse cross-sectional area.

3. The bicycle storage system, according to claim 2, wherein said substantially elongated body of said at least one container comprises a cylindrical shape having a maximum outer diameter of about 2⅞ inches.

4. The bicycle storage system, according to claim 3, wherein:

a) said substantially elongated body of said at least one container comprises at least one reduced transverse cross-sectional area located about five inches above said at least one base end;

b) said at least one reduced transverse cross-sectional area is oriented along and perpendicularly of said longitudinal axis; and c) said reduced transverse cross-sectional area is less than about 6½ square inches.

5. The bicycle storage system, according to claim 1, wherein:

a) said at least one access cover comprises at least one removable lid; and b) said at least one hingeless coupler comprises at least one threaded coupler structured and arranged to assist threaded coupling of said at least one removable lid to said at least one container.

6. The bicycle storage system, according to claim 1, wherein said at least one item positioner comprises at least one tool-engaging retainer structured and arranged to releasably retain at least one bicycle tool adjacent said at least one item positioner.

7. The bicycle storage system, according to claim 1, wherein said at least one item positioner comprises at least one bicycle-tube retainer structured and arranged to releasably retain at least one bicycle tube adjacent said at least one item positioner.

8. The bicycle storage system, according to claim 1, wherein said at least one item positioner is firmly coupled with said at least one access cover.

* * * * *